(No Model.)

G. COPE.
CANVAS STRETCHING DEVICE.

No. 424,096. Patented Mar. 25, 1890.

WITNESSES:
David G. Williams
Joshua Matlack, Jr.

INVENTOR:
George Cope
by his attorneys
Francis T. Chambers

UNITED STATES PATENT OFFICE.

GEORGE COPE, OF WEST CHESTER, PENNSYLVANIA.

CANVAS-STRETCHING DEVICE.

SPECIFICATION forming part of Letters Patent No. 424,096, dated March 25, 1890.

Application filed December 3, 1889. Serial No. 332,415. (No model.)

*To all whom it may concern:*

Be it known that I, GEORGE COPE, of West Chester, county of Chester, State of Pennsylvania, have invented a new and useful Canvas-Stretching Device, of which the following is a true and exact description, reference being had to the accompanying drawings, which form a part of this specification.

My invention relates to canvas-stretching devices, and has for its object to provide an appliance which can be secured to connected parts of the frame upon which the canvas is stretched, and which will serve at the same time as a secure brace to the frame and as a means for extending the parts thereof so as to tighten and keep tight the canvas.

The nature of my invention will be best understood after a description of the drawings in which it is illustrated, and its novel features are hereinafter clearly pointed out in the claims.

Figure 1:
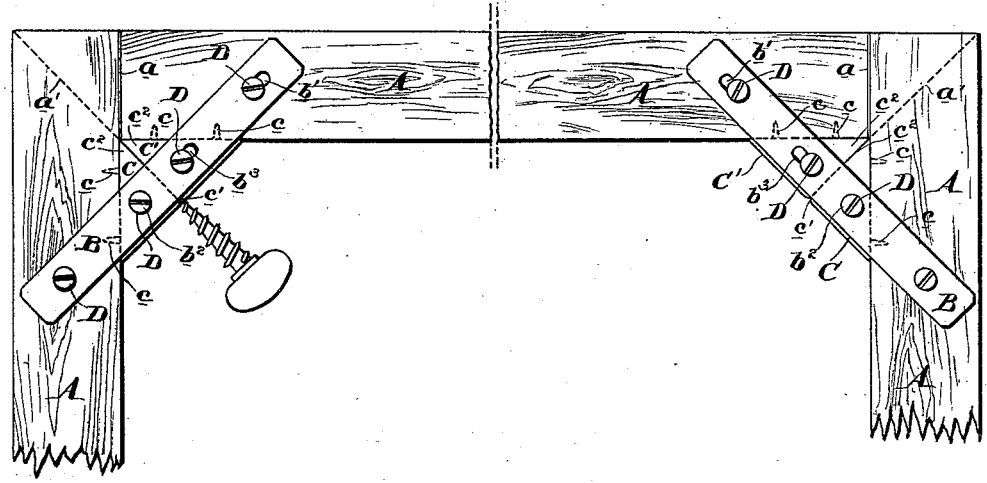
Figure 2:
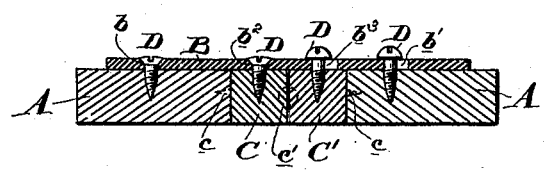
Figure 3:
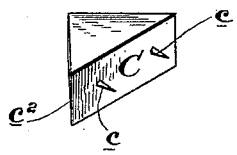

In the drawings, Figure 1 is a plan view of a portion of the canvas-stretching frame with my improved devices attached to it. Fig. 2 is a section on the line $x\ x$ of Fig. 1, and Fig. 3 a perspective view of a part of my device.

A A A indicate connected parts of the frame, forming together joints $a\ a$, or beveled joints such as are indicated by the dotted lines marked $a'\ a'$.

D is a brace-plate, which is intended to be secured to the two connected parts of the frame, as shown. It is provided at one end with one or more screw-holes $b$, and at the other end with a groove $b'$, and held to the parts A of the frame by screws D passing through said holes and slots. The brace-plate should be secured to the frame in the position indicated, so that the slot $b'$ will run at right angles to a line bisecting the angle which adjacent parts of the frame make with each other.

C C' are angular gage-blocks, the angular points $c^2$ of which should be approximately of forty-five degrees, so that when placed together, as shown, they will make up a right angle, which will fit in the right angle formed by adjacent parts A of the frame. These gage-blocks are secured to the brace-bar B, one of them by means of a slot $b^3$ and screw D, so that it can slide longitudinally upon said bar. The other one C is preferably secured permanently to the brace-bar, as by a screw D passing through a hole $b^2$ in bar B; or it may be formed integral with said bar.

Upon the faces of the brace-blocks C C' which come in contact with the parts A of the frame I prefer to form projections or spuds $c$, which will project into the parts A of the frame and prevent the blocks C C' from slipping. The brace bar or plate B and the gage-blocks C C', having been secured together in the manner shown, are then secured to the frame, and a tapered screw E is then inserted in the joint formed by the abutting sides of the blocks C C', as indicated at $c'$. As the screw penetrates this joint the movable block C' is forced apart from the block C and forces the adjacent part A of the frame in the same direction—to wit, at right angles to the line bisecting the angle formed by adjacent parts A of the frame, and this being the line in which the slot $b'$ lies the adjacent parts A A of the frame can move apart without resistance from the brace-plate B. The canvas is thus brought to a proper tension and can at any time be readjusted by moving the screws.

The device shown and described is especially intended for use with frames having joints $a$, which run parallel with one of the parts A making up the frame; but it is equally applicable to frames having beveled joints, such as are indicated by dotted lines $a'$.

Any tapered screw can be used in connection with my appliance, as well as the thumb-screw, such as indicated in the drawings.

Having now described my invention, what I claim as new, and desire to secure by Letters Patent, is—

1. In a canvas-stretching device, the plate B, having a slot at one end and a screw hole or holes at the other end for securing it to adjacent parts of the frame, in combination with angular blocks C C', both attached to plate B, and one or both adapted to slide thereon, substantially as and for the purpose specified.

2. In a canvas-stretching device, the plate B, having a slot at one end and a screw hole or holes at the other end for securing it to adjacent parts of the frame, in combination with angular blocks C C', both attached to plate B, and one or both adapted to slide thereon, teeth *c c*, projecting from the faces of blocks C C′ which come in contact with the frame, all substantially as and for the purpose specified.

3. In a canvas-stretching device, the plate B, having a slot at one end and a screw hole or holes at the other end for securing it to adjacent parts of the frame, in combination with angular blocks C C′, both attached to plate B, and one or both adapted to slide thereon, and a tapered screw adapted to enter the space between the said angular blocks and force them apart.

GEO. COPE.

Witnesses:
D. M. McFARLAND,
WM. P. MERCER.